United States Patent
Jung et al.

(10) Patent No.: US 8,743,900 B2
(45) Date of Patent: Jun. 3, 2014

(54) APPARATUS AND METHOD FOR REDUCING POWER CONSUMPTION OF ACCESS POINT FUNCTION IN PORTABLE TERMINAL

(75) Inventors: Bu-Seop Jung, Suwon-si (KR); Jong-Mu Choi, Gunpo-si (KR); Jung-Hun Lee, Suwon-si (KR); Jae-Ki You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 625 days.

(21) Appl. No.: 12/970,032

(22) Filed: Dec. 16, 2010

(65) Prior Publication Data

US 2011/0161700 A1 Jun. 30, 2011

(30) Foreign Application Priority Data

Dec. 24, 2009 (KR) .................. 10-2009-0131159

(51) Int. Cl.
*H04L 12/413* (2006.01)
(52) U.S. Cl.
USPC ............................ 370/447; 370/461; 370/462

(58) Field of Classification Search
USPC .................................. 370/447, 461, 462, 338
See application file for complete search history.

(56) References Cited

U.S. PATENT DOCUMENTS

| | | | |
|---|---|---|---|
| 2003/0137992 A1* | 7/2003 | Sharper et al. ................. | 370/468 |
| 2005/0289371 A1* | 12/2005 | Makiyama et al. ............ | 713/300 |
| 2010/0118762 A1* | 5/2010 | Hashimoto et al. ........... | 370/315 |
| 2010/0284316 A1* | 11/2010 | Sampathkumar ............. | 370/311 |
| 2011/0161700 A1* | 6/2011 | Jung et al. ..................... | 713/320 |

* cited by examiner

*Primary Examiner* — Benjamin H Elliott, IV
(74) *Attorney, Agent, or Firm* — Jefferson IP Law, LLP

(57) ABSTRACT

An apparatus and a method for operating as a virtual terminal to participate in competition for medium access while a mobile terminal operates as an access point are provided. In a case where the mobile terminal accesses a medium while competing with a terminal that transmits data of low priority, an apparatus and a method for entering a low power mode to resolve a power consumption problem of the mobile terminal are provided. The apparatus includes a medium competing unit, which allows the mobile terminal to operate as a virtual terminal and participate in competition for a medium access when data to be transmitted does not exist in the mobile terminal operating as an Access Point (AP).

12 Claims, 4 Drawing Sheets

APPARATUS AND METHOD FOR REDUCING POWER CONSUMPTION OF ACCESS POINT FUNCTION IN PORTABLE TERMINAL

PRIORITY

This application claims the benefit under 35 U.S.C. §119 (a) of a Korean patent application filed in the Korean Intellectual Property Office on Dec. 24, 2009 and assigned Serial No. 10-2009-0131159, the entire disclosure of which is hereby incorporated by reference.

BACKGROUND OF THE INVENTION

1. Field of the Invention

The present invention relates to an apparatus and a method for minimizing power consumption of a mobile terminal. More particularly, the present invention relates to an apparatus and a method for minimizing power consumption of a mobile terminal that perform an Access Point (AP) function.

2. Description of the Related Art

Recently, mobile terminals have become necessities to many people without distinction of age and gender. Service providers and terminal manufacturers are competitively developing products (or services) for differentiation from other competitors.

For example, mobile terminals have evolved to become a multimedia apparatus that can provide various services including any or all of a phonebook, games, a Short Message Service (SMS), an Electronic (E)-mail, a morning call, a Motion Picture Expert Group Audio Layer-3 (MP3) player, a digital camera, a multimedia message, and a wireless Internet service, and the like.

To use a packet data service including a multimedia message and a wireless Internet in the mobile terminal, connection with an Access Point (AP) of a relevant service need to be performed.

That is, the mobile terminal uses a packet data service by transmitting data to an AP. Under an environment where the AP does not exist, the mobile terminal cannot use the packet data service.

To use the packet data service under an environment where an AP does not exist, a technique for using the mobile terminal as an AP is under development.

As the mobile terminal that operates as an AP should buffer data to be transmitted to terminals operating in a low power mode, the mobile terminal should always be provided with power. However, the mobile terminal is provided with power via a battery, and a problem occurs in supplying power to the mobile terminal via a limited battery while the mobile terminal operates as an AP.

Accordingly, to allow the mobile terminal to perform a function of an AP, a need exists for an apparatus and a method for minimizing power consumption of a mobile terminal that performs an operation of an AP.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for minimizing power consumption of a mobile terminal that performs an operation of an Access Point (AP).

Another aspect of the present invention is to provide an apparatus and a method for raising a medium occupancy ratio of a terminal that transmits actual data in a mobile terminal that performs an operation of an AP.

Still another aspect of the present invention is to provide an apparatus and a method for allowing a mobile terminal to operate as a virtual terminal to participate in competition for a medium access in a case where the mobile terminal that performs an operation of an AP does not transmit data.

Yet another aspect of the present invention is to provide an apparatus and a method for operating a mobile terminal in a low power mode to minimize power consumption in a case where the mobile terminal that performs an operation of an AP occupies a medium as a virtual terminal.

In accordance with an aspect of the present invention, an apparatus for reducing power consumption by a function of an Access Point (AP) in a mobile terminal is provided. The apparatus includes a medium competing unit for allowing the mobile terminal to operate as a virtual terminal and participate in competition for a medium access when data to be transmitted does not exist in the mobile terminal operating as an AP.

In accordance with another aspect of the present invention, a method for reducing power consumption by a function of an Access Point (AP) in a mobile terminal is provided. The method includes allowing the mobile terminal to operate as a virtual terminal and participate in competition for a medium access when data to be transmitted does not exist in the mobile terminal operating as an AP.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description to ken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
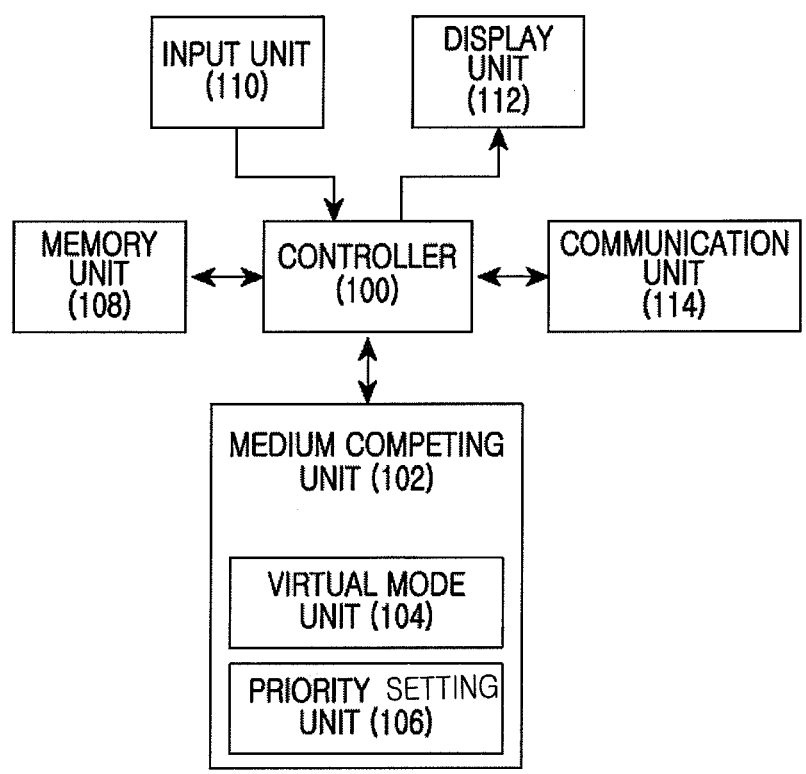
FIG. 1 is a block diagram illustrating a mobile terminal that performs an Access Point (AP) function of low power mode according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as de fined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for entering a low power mode to address a power consumption problem of a mobile terminal in a case where the mobile terminal that operates as an Access Point (AP) participate in competition for a medium access as a virtual terminal and accesses a medium.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a mobile terminal that performs an AP function of a low power mode according to an exemplary embodiment of the present invention.

Referring to FIG. 1, a mobile terminal may include a controller 100, a medium competing unit 102, a memory unit 108, an input unit 110, a display unit 112, and a communication unit 114. The medium competing unit 102 may include a virtual mode unit 104 and a priority setting unit 106. The mobile terminal may include additional units that are not illustrated here merely for sake of clarity. Similarly, the functionality of two or more of the above units may be integrated into a single component.

First, the controller 100 of the mobile terminal controls an overall operation of the mobile terminal. For example, the controller 100 performs processes and controls for voice communication and data communication. In addition to the typical functions of the mobile terminal, the controller 100 allows the mobile terminal to perform an AP function, so that a user may use the Internet anywhere using a portable apparatus, such as a notebook computer, which cannot utilize a cellular network.

Furthermore, according to an exemplary embodiment of the present invention, when performing the AP function, the controller 100 prevents terminals that transmit actual data from failing to access a medium.

To prevent a terminal that transmits actual data from failing to access a medium, the controller 100 prevents a terminal that transmits actual data of a low priority from failing to access the medium by allowing a virtual terminal that transmits data of a lowest priority to participate in competition for a media access in a virtual terminal mode.

That is, in a case where the mobile terminal operates as an AP and does not perform data transmission, the controller 100 allows the mobile terminal to operate as a virtual terminal of a low priority to perform competition for a medium access with terminals that transmit actual data.

In addition, in a case where the mobile terminal occupies a medium as the virtual terminal in the competition for a medium access (that is, the mobile terminal accesses the medium in the competition with terminals of a low priority), the controller 100 allows the mobile terminal to enter a low power mode to minimize power consumption since the mobile terminal is not a terminal that transmits actual data.

When determining that the mobile terminal is an AP and data to be transmitted does not exist under the control of the controller 100, the medium competing unit 102 allows the mobile terminal to operate as a virtual terminal to perform competition for a medium access with a terminal that transmits actual data. At this point, the medium competing unit 102 prevents terminals that transmit actual data from failing to occupy the medium by setting the mobile terminal to a terminal of a low priority and preventing a virtual terminal from occupying a medium.

In addition, in a case where the mobile terminal operates as a virtual terminal to occupy a medium, the medium competing unit 102 allows the mobile terminal to enter a low power mode during a time period of medium occupancy, since the mobile terminal does not transmit actual data, to minimize power consumption of the mobile terminal that operates as the AP.

The virtual mode unit 104 changes an operation mode of the mobile terminal from an AP mode to a virtual terminal mode to allow the mobile terminal to compete with terminals that transmit actual data under control of the controller 102. The priority setting unit 106 sets a priority of the mobile terminal that operates as the virtual mode. At this point, the priority setting unit 106 sets the mobile terminal to a virtual terminal of a low priority. The priority setting unit 106 may raise a medium access probability of terminals that transmit actual data by raising the priority of the virtual terminal, and increase a frequency of entering a low power mode by raising the probability that the virtual terminal accesses a medium.

The memory unit 108 may include any or all of a Read Only Memory (ROM), a Random Access Memory (RAM), a flash ROM, and the like. The ROM stores microcodes of programs for processes and controls of the controller 100 and the medium competing unit 102, and various reference data.

The RAM serves as a working memory of the controller 100 and stores temporary data occurring during execution of various programs. In addition, the flash ROM stores various updatable data for storage, such as a phonebook, calling messages, and received messages.

The input unit 120 includes a plurality of function keys, such as numerical key buttons of 0 through 9, a menu button, a cancel button, an OK button, a TALK button, an END button, an Internet access button, navigation key (or directional key) buttons, letter input keys, and the like. The input unit 120 provides key input data corresponding to a key pressed by a user to the controller 100.

The display unit 112 displays status information generated during an operation of the mobile terminal, letters, moving images, still images, and the like. The display unit 112 may be a color Liquid Crystal Display (LCD) and may have a touch input device. When the display unit 112 having the touch input device is applied to a touch input type mobile terminal, the display unit 112 may serve as an input unit.

The communication unit 114 transmits/receives a Radio Frequency (RF) signal of data input/output via an antenna (not illustrated). For example, during transmission, the communication unit 114 channel-codes and spreads data to be transmitted, and then performs an RF process on the signal to transmit the signal. During reception of data, the communication unit 114 converts a received RF signal into a baseband signal, and despreads and channel-decodes the baseband signal to recover data.

The function of the medium competing unit 102 may be performed by the controller 100 of the mobile terminal. The separate configuration and illustration of the medium competing unit 102 are exemplary implementations and not meant to limit the scope of the present invention. It would be obvious to those skilled in the art that various modifications may be made within the scope of the present invention. For example, all of the functions of the medium competing unit 102 may be processed by the controller 100.

Figure 2:
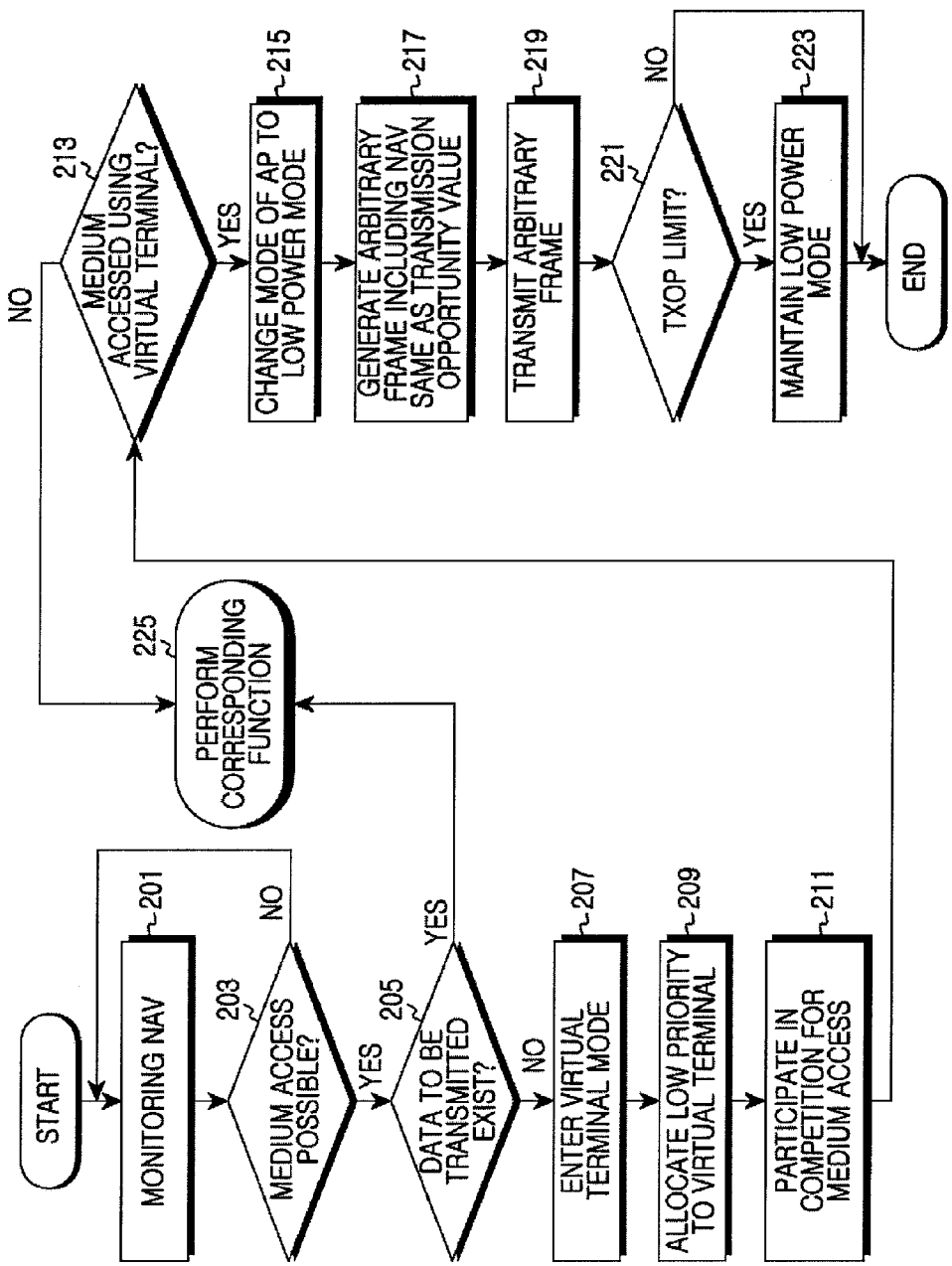
FIG. 2 is a flowchart illustrating a process for performing a low power mode in a mobile terminal that performs an AP function according to an exemplary embodiment of the present invention.

FIG. 2 is a flowchart illustrating a process for performing a low power mode in a mobile terminal that performs an AP function according to an exemplary embodiment of the present invention.

Referring to FIG. 2, an AP supports Wi-Fi Multi-Media (WMM) that gives priority to data in a delay-sensitive order and processes data according to the priority. Terminals that can access the AP may not support the WMM.

In step 201, the AP monitors a Network Allocation Vector (NAV) in order to determine whether medium access is possible.

Here, the NAV represents time information in a case where a medium is reserved. A terminal and an AP that have been successful in a medium access may estimate a time until data transmission ends and sets the time to the NAV.

Additionally, the NAV uses a duration field value set as a default in all data frames.

In step 203, the AP determines whether a medium access is possible by determining the NAV. The AP and terminals do not access a medium until the NAV becomes 0.

That is, a case where the NAV becomes 0 is a circumstance where a medium is empty, and the AP and terminals may participate in competition.

If it is determined in step 203 that a medium access is impossible, the AP re-performs the process of step 201.

In contrast, if it determined in step 203 that the medium access is possible, the AP determines whether data to be transmitted exists in step 205.

If it is determined in step 205 that data to be transmitted exists, the AP performs a relevant function (e.g., transmits data as the AP) in step 225.

In contrast, if it is determined in step 205 that data to be transmitted does not exist, the AP enters a virtual terminal mode in step 207. Here, the virtual terminal mode denotes a mode that prevents a terminal of a low priority from failing to occupy a medium and operates the AP as a virtual terminal of a low priority in the AP that occupies a medium according to a priority.

In step 209, the AP allocates a low priority to the AP that enters a virtual terminal mode. Here, allocation of the low priority to the virtual terminal is for allowing the virtual terminal of a lowest priority to participate in competition for a medium access in order to pr event a terminal of a low priority from failing to occupy the medium. Accordingly, as the virtual terminal participates in the medium access competition at the low priority, the virtual terminal may fail to access the medium in the competition with terminals that transmit actual data. At this point, in the case where the virtual terminal participates in the competition for a medium access with terminals that transmit actual data having the same priority as that of the virtual terminal, the virtual terminal may access the medium. However, since data having a lowest priority is not sensitive to delay, performance deterioration caused by the virtual terminal that occupies the medium is trivial. Therefore, in the case where the virtual terminal occupies the medium according to an exemplary embodiment of the present invention, a low power mode may be performed.

In step 211, the AP participates in the competition for a medium access. That is, as a virtual terminal, the AP participates in the competition with a plurality of terminals that can access the AP, but since the virtual terminal has a lowest priority, the virtual terminal may fail in the competition.

In step 213, the AP determines whether the AP has occupied the medium in a virtual terminal mode. That is, the AP determines whether the AP has occupied the medium in the competition with terminals having the same priority as the priority set in advance.

If it is determined in step 213 that the AP does not occupy the medium as the virtual terminal, the AP performs a relevant function (e.g., competes so that a terminal that transmits actual data may access the medium) in step 225.

In contrast, if it is determined in step 213 that the AP occupies the medium as the virtual terminal, the AP enters a low power mode in step 215.

That is, when data to be transmitted does not exist, the AP operates as a virtual terminal to participate in medium access competition in order to prevent a terminal that transmits actual data from failing to access the medium. However, in a case where the virtual terminal is successful in accessing the medium in the competition for the medium access with of her terminals that participate in the competition (that is, in the case where the virtual terminal is successful in accessing the medium in the competition for the medium access with the terminals having the same priority as that of the virtual terminal), since the AP is not a terminal that transmits actual data, the AP enters a low power mode to minimize power consumption. A described above, since data to be transmitted by the terminals that have competed with the virtual terminal is not sensitive to delay, the AP operates in the low power mode during a time period where the AP as the virtual terminal occupies the medium.

In step 217, the AP that enters the low power mode generates an arbitrary frame including the same NAV as a transmission opportunity value, and transmits the generated frame in step 219.

That is, to prevent medium access from other terminals during a low power mode time period, the AP generates and transmits an arbitrary frame. The arbitrary frame includes an NAV to prevent a medium access during a relevant time period, and maintains a low power mode. At this point, the NAV is set using a Transmission Opportunity (TxOp) Limit, which is a time representing a time period enabling data transmission.

In step 221, the AP determines whether a TxOp Limit preventing a medium access arrives.

If it is determined in step 221 that the TxOp Limit arrives, the AP maintains a low power mode during the TxOp Limit in step 223.

In contrast, if it is determined in step 221 that the TxOp Limit does not arrive, the mobile terminal determines a low power mode does not arrive, and then ends the present algorithm.

Figure 3:
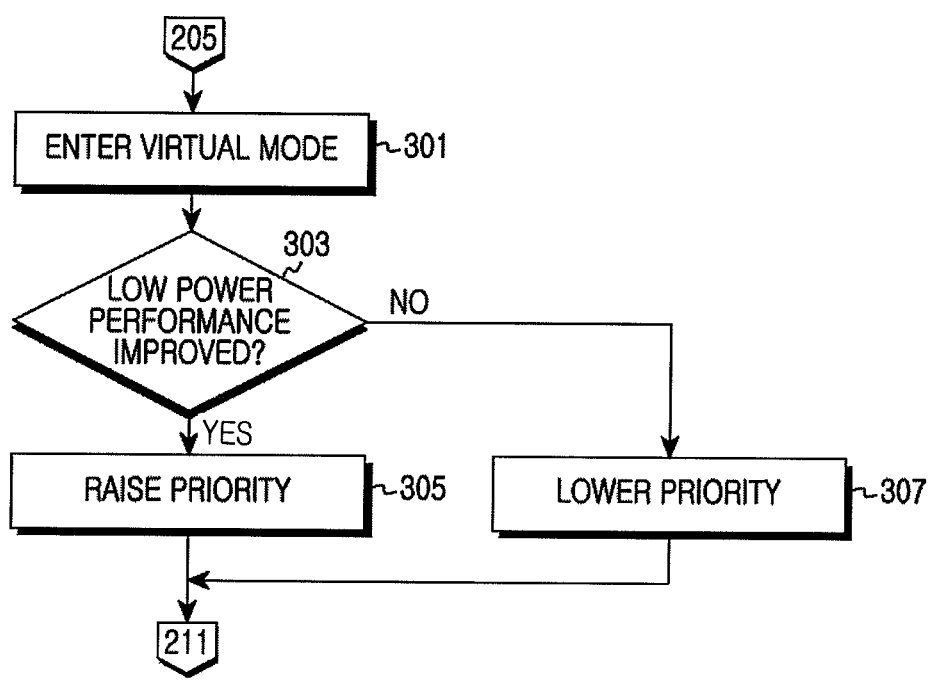
FIG. 3 is a flowchart illustrating a process for entering a virtual terminal mode in a mobile terminal that performs an AP function according to an exemplary embodiment of the present invention.

FIG. 3 is a flowchart illustrating a process for entering a virtual terminal mode in a mobile terminal that performs an AP function according to an exemplary embodiment of the present invention.

Referring to FIG. 3, an AP determines whether a medium access is possible and enters a virtual terminal mode in step 301.

Here, as described above, the virtual terminal mode denotes a mode where an AP that occupies a medium according to a priority prevents a terminal of a low priority from failing to occupy a medium and operates as a terminal of a low priority.

In step 303, the AP determines whether to improve performance of a low power mode.

Here, the performance of the low power mode may be controlled by changing the priority of a virtual terminal. In a case of raising the priority of the virtual terminal and participating in competition, a medium access probability of terminals that transmit actual data may be raised. At this point, since the priority of the virtual terminal is high and the probability that the virtual terminal may access a medium is raised, the probability of entering a low power mode is raised.

For example, in a case where a priority is set to "Best Effort", not "background" priority, a medium access probability is raised compared to a case where the priority is set to "background" priority. At this point, voice and video traffic are not influenced, but data traffic having Best Effort may be delayed.

If it is determined in step 303 that the performance of the low power mode is improved, the AP raises the priority of the virtual terminal in step 305.

In contrast, if it is determining in step 303 that the performance of the low power mode is not improved, the AP lowers the priority of the virtual terminal in step 307.

The AP that has set the priority of the virtual terminal participates in competition for a medium access in step 211 of FIG. 2. That is, the AP participates in competition as the virtual terminal whose priority has been set as described above with a plurality of terminal that can access the AP to raise the probability that a terminal that transmits actual data may access a medium, and simultaneously, to raise the probability that the virtual terminal may occupy the medium, thereby increasing an opportunity that can reduce power consumption.

Figure 4:
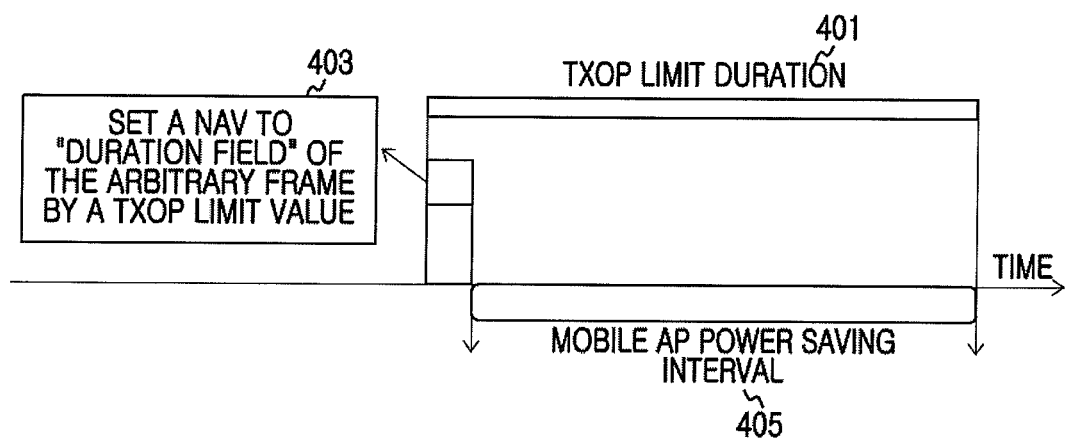
FIG. 4 is a view illustrating a time period where a mobile terminal that performs an AP function operates in a low power mode according to an exemplary embodiment of the present invention.

FIG. 4 is a view illustrating a time period where a mobile terminal that performs an AP function operates in a low power mode according to an exemplary embodiment of the present invention.

Referring to FIG. 4, when data to be transmitted does not exist, an AP changes to a virtual terminal mode to increase the probability that a terminal that transmits actual data occupies a medium.

That is, the AP does not actually transmit data but operates as a virtual terminal of a low priority so that terminals that occupy a medium according to a priority may occupy the medium to participate in competition with terminals that transmit actual data.

At this point, since the AP operates as a terminal of a low priority, the AP fails to occupy the medium through the competition with the terminals that transmit actual data.

However, in a case where terminals that participate in the competition are terminals that transmit data of a low priority, the AP may occupy the medium by competing with terminals of the same priority through "Random back-off" in order to access the medium. Since data of a low priority is not sensitive to delay, performance deterioration caused when the virtual terminal occupies the medium is trivial.

In a case where the AP that operates as the virtual terminal accesses the medium through competition with terminals that transmit data of a low priority, the AP enters a low power mode to reduce power consumption according to an exemplary embodiment of the present invention.

At this point, the AP needs to transmit an arbitrary frame having no actual data in order to prevent a medium access while operating in a low power mode.

In step 401, the AP sets an NAV to a "duration field" of the arbitrary frame by a TxOp Limit value, and transmits the same in step 403.

Therefore, in step 405, the AP operates in a low power mode during the TxOp Limit, and prevents a medium access of other terminals.

Even during the low power mode obtained through the competition, the AP operates in the low power mode to participate in the competition whenever the medium is empty.

As described above, since the AP participates in the competition as a terminal having a lowest priority, the AP does not have an influence on a medium access of a terminal having data of a higher priority than that of the AP. In addition, in a case where actual traffic is not high, the frequency that the AP operates as the virtual terminal occupying the medium increases, and so the AP operates in the low power mode, thereby minimizing power consumption.

As described above, exemplary embodiments of the present invention address a power consumption problem of a mobile terminal by entering a low power mode when a mobile terminal that operates as an AP participates in competition for a medium access as a virtual terminal to access the medium. The mobile terminal participates in the competition for the medium access as the virtual terminal to raise a medium access ratio of a terminal that transmits actual data, and operates in a low power mode in the case where the mobile terminal accesses the medium as the virtual terminal, thereby addressing a power consumption problem that may occur in a typical mobile terminal.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. An apparatus for reducing power consumption by a function of an Access Point (AP) in a mobile terminal, the apparatus comprising:
a controller;
a medium competing unit, operatively coupled to the controller, configured to allow the mobile terminal to operate as a virtual terminal and participate in competition for a medium access when data to be transmitted does not exist in the mobile terminal operating as an AP,
wherein the medium competing unit allows the mobile terminal to participate in the competition for the medium access as the virtual terminal that transmits data of a low priority.

2. The apparatus of claim 1, wherein when the mobile terminal occupies the medium as the virtual terminal in the competition for the medium access, the medium competing unit allows the mobile terminal to operate in a low power mode.

3. The apparatus of claim 2, wherein after entering the low power mode, the medium competing unit generates and transmits an arbitrary frame comprising:
a time period during which the mobile terminal operates in the low power mode to prevent a medium access during the operation of the low power mode.

4. The apparatus of claim 1, wherein the medium competing unit changes a priority of the virtual terminal to improve performance of a low power mode.

5. The apparatus of claim 1, wherein the medium competing unit comprises:
a virtual mode unit configured to change an operation mode of the mobile terminal from an AP mode to a virtual terminal mode to allow the mobile terminal to compete with terminals that transmit actual data; and
a priority setting unit configured to set a priority of the mobile terminal that operates as the virtual terminal mode, wherein the priority setting unit sets the mobile terminal to a virtual terminal of a low priority.

6. The apparatus of claim 5, wherein the priority setting unit raises a medium access probability of terminals that transmit actual data by raising the priority of the virtual terminal, and increases a frequency of entering a low power mode by raising a probability that the virtual terminal accesses a medium.

7. A method for reducing power consumption by a function of an Access Point (AP) in a mobile terminal, the method comprising:
allowing the mobile terminal to operate as a virtual terminal and participate in competition for a medium access when data to be transmitted does not exist in the mobile terminal operating as an AP,
wherein participation of the mobile terminal in the competition for the medium access comprises operating the mobile terminal as the virtual terminal that transmits data of a low priority.

8. The method of claim 7, further comprising:
when occupying a medium using the virtual terminal in the competition for the medium access, operating in a low power mode.

9. The method of claim 8, further comprising:
after entering the low power mode, preventing a medium access during an operation of the low power mode by generating and transmitting an arbitrary frame comprising a time period during which the mobile terminal operates in the low power mode.

10. The method of claim 8, further comprising:
changing an operation mode of the mobile terminal from an AP mode to a virtual terminal mode to allow the mobile terminal to compete with terminals that transmit actual data; and
setting a priority of the mobile terminal that operates as the virtual terminal mode and set the mobile terminal to a virtual terminal of a low priority.

11. The method of claim 10, further comprising:
raising the medium access probability of terminals that transmit actual data by raising the priority of the virtual terminal, and increasing a frequency of entering a low power mode by raising the probability that the virtual terminal accesses a medium.

12. The method of claim 7, wherein the participating in the competition for the medium access comprises:
changing a priority of the virtual terminal to improve performance of a low power mode.

\* \* \* \* \*